(12) United States Patent
Perez

(10) Patent No.: US 9,605,688 B2
(45) Date of Patent: Mar. 28, 2017

(54) SITE DRAINER

(71) Applicant: Antonio Perez, Clifton, NJ (US)

(72) Inventor: Antonio Perez, Clifton, NJ (US)

(73) Assignee: Site Drainer, LLC, Clifton, NJ (US)

( * ) Notice: Subject to any disclaimer, the term of this patent is extended or adjusted under 35 U.S.C. 154(b) by 302 days.

(21) Appl. No.: 14/217,784

(22) Filed: Mar. 18, 2014

(65) Prior Publication Data

US 2014/0199178 A1   Jul. 17, 2014

Related U.S. Application Data

(63) Continuation-in-part of application No. 14/133,810, filed on Dec. 19, 2013, which is a continuation of
(Continued)

(51) Int. Cl.
*F04D 29/70* (2006.01)
*F04D 15/02* (2006.01)
(Continued)

(52) U.S. Cl.
CPC .......... *F04D 29/708* (2013.01); *B01D 29/23* (2013.01); *B01D 35/26* (2013.01); *C02F 1/001* (2013.01);
(Continued)

(58) Field of Classification Search
None
See application file for complete search history.

(56) References Cited

U.S. PATENT DOCUMENTS 3,695,173 A    10/1972  Cox
3,717,420 A *   2/1973  Rachocki ............ F04D 15/0218
                                                     417/12
(Continued)

FOREIGN PATENT DOCUMENTS

CA    1327482    3/1994
CN    2338331 Y  9/1999
(Continued)

OTHER PUBLICATIONS

PCT/US2011/034761; Perez, Antonio; PCT International Search Report and Written Opinion Mar. 2, 2012.
(Continued)

*Primary Examiner* — Terry Cecil
(74) *Attorney, Agent, or Firm* — Gearhart Law LLC

(57) ABSTRACT

A liquid transfer device is disclosed that has a fluid pump enclosed within a rigid, space enclosing housing. The pump has a strainer with strainer openings that provide a fluid connection between the pump and the inside of the housing. The strainer is located at the lower end of the pump and the housing. There are also openings in the housing that provide a fluid connection between the inside of the housing and its outer surface. The maximum size of the openings in the housing is less than the minimum size of the strainer openings so that the strainer does not clog with debris. A discharge manifold provides a fluid connection between the pump and the outside the housing. In this way fluid is drawn in through the housing openings and then the strainer before being pumped out via the discharge manifold.

16 Claims, 4 Drawing Sheets

Related U.S. Application Data application No. 13/098,624, filed on May 2, 2011, now Pat. No. 8,636,898.

(60) Provisional application No. 61/329,641, filed on Apr. 30, 2010.

(51) Int. Cl.
| | | |
|---|---|---|
| *B01D 35/26* | (2006.01) | |
| *B01D 29/23* | (2006.01) | |
| *C02F 1/00* | (2006.01) | |
| *F04D 13/08* | (2006.01) | |
| *C02F 1/44* | (2006.01) | |
| *C02F 103/00* | (2006.01) | |

(52) U.S. Cl.
CPC ....... *F04D 13/086* (2013.01); *F04D 15/0218* (2013.01); *B01D 2201/64* (2013.01); *C02F 1/006* (2013.01); *C02F 1/444* (2013.01); *C02F 2103/001* (2013.01); *C02F 2209/42* (2013.01)

(56) References Cited

U.S. PATENT DOCUMENTS

| | | | |
|---|---|---|---|
| 3,941,507 A * | 3/1976 | Niedermeyer | ........ F04B 49/025 |
| | | | 320/137 |
| 3,972,647 A | 8/1976 | Niedermeyer | |
| 4,201,519 A * | 5/1980 | Niedermeyer | .......... F04D 13/08 |
| | | | 417/360 |
| 4,330,306 A | 5/1982 | Salant | |
| 4,439,323 A * | 3/1984 | Ball | ....................... B01D 36/04 |
| | | | 210/532.2 |
| 4,861,472 A | 8/1989 | Weis | |
| 5,011,600 A | 4/1991 | Mowka, Jr. et al. | |
| 5,030,346 A | 7/1991 | McEwen | |
| 5,085,771 A | 2/1992 | Huang | |
| 5,141,650 A | 8/1992 | Cavo et al. | |
| 5,154,584 A | 10/1992 | McEwen | |
| 5,160,039 A | 11/1992 | Colburn | |
| 5,215,656 A | 6/1993 | Stoneburger | |
| 5,249,930 A | 10/1993 | Pacquesi | |
| 5,520,808 A | 5/1996 | Stoneburger et al. | |
| 5,702,607 A | 12/1997 | Lawson | |
| 5,759,393 A | 6/1998 | Nurse, Jr. | |
| 5,769,603 A * | 6/1998 | Fujiwara | ................... F04D 7/04 |
| | | | 415/169.1 |
| 5,807,480 A | 9/1998 | Kanazawa | |
| 5,815,544 A | 9/1998 | Lefter | |
| 6,551,508 B1 | 4/2003 | Bovington | |
| 6,793,813 B1 | 9/2004 | Ethridge et al. | |
| 6,843,910 B1 | 1/2005 | Thomas | |
| 6,869,530 B1 | 3/2005 | Venezia | |
| 6,875,364 B2 | 4/2005 | Gordon | |
| 7,101,420 B1 | 9/2006 | Ellis | |
| 7,241,382 B2 | 7/2007 | Gordon | |
| 7,347,933 B2 | 3/2008 | Berry, III et al. | |
| 7,585,408 B2 | 9/2009 | Weindorf et al. | |
| 7,878,218 B2 * | 2/2011 | Ivan | ................... B01D 21/2461 |
| | | | 137/899 |
| 8,636,898 B2 * | 1/2014 | Perez | ..................... B01D 29/23 |
| | | | 210/149 |
| 2005/0263450 A1 | 12/2005 | McGrew, Jr. | |
| 2006/0064825 A1 | 3/2006 | Reed | |
| 2009/0183785 A1 | 7/2009 | Cole et al. | |

FOREIGN PATENT DOCUMENTS

| | | | |
|---|---|---|---|
| CN | 2659957 Y | 12/2004 | |
| GB | 533696 A * | 2/1941 | ............ F04D 13/08 |
| JP | 55011061 | 1/1980 | |
| JP | 62033509 | 2/1987 | |
| JP | 63194708 | 8/1988 | |
| JP | 03101886 | 4/1991 | |
| JP | 06276891 | 10/1994 | |
| JP | 2003080010 | 3/2003 | |
| JP | 2003080243 | 3/2003 | |
| JP | 2007061748 | 3/2007 | |
| WO | 94/13380 A1 | 6/1994 | |
| WO | 03/064106 A1 | 8/2003 | |
| WO | 04000437 A1 | 12/2003 | |
| WO | 2007/040421 A1 | 4/2007 | |
| WO | 2007/098059 A2 | 8/2007 | |
| WO | 2007/098059 A3 | 8/2007 | |

OTHER PUBLICATIONS

PCT International Preliminary Report on Patentability; PCT/US2011/034761 Nov. 15, 2012.
Ebay, Inc., Hidropoint, Stainless Steel Waterfall Pump ½HP 115 V 400 GPH—HPSSWF4000, www.ebay.com/itm/Stainless-Steel-Waterfall-Pump-1-2HP-115V-4000-GPH-HPSS, Sep. 28, 2013. eBay Inc.
Lowe's Companies, Inc., Utilitech ½ HP Waterfall Pump, www.lowes.com/pd 41844-15649-PPWF33 0, Oct. 19 and 23, 2011.
Utilitech, Utilitech Submersible Waterfall Pump Model #PWF33 Product Instruction Book, pp. 1-10, LF,LLC.
Ebay, Inc., Hidropoint, Stainless Steel Waterfall Pump ½HP 115 V 400 GPH—HPSSWF4000, www.ebay.in/itm/ws/eBayISAPI.dllStainless-Steel-Waterfall-Pump-1-2HP-115V-4000-GPH-HPSS, Dec. 2, 2012, eBay Inc.
EPO Application No. 11 775 692.4 Perez, Antonio; EPO Search Report.
EPO Application No. 11 775 692.4; Supplementary European Search Report, Munich, Sep. 24, 2013.

* cited by examiner

SITE DRAINER

CLAIM OF PRIORITY

This application claims priority to U.S. patent application Ser. No. 14/133,810 filed on Dec. 19, 2013 that in turn claims priority to U.S. patent application Ser. No. 13/098,624 filed on Monday, May 2, 2011 that issued as U.S. Pat. No. 8,636,898 on Jan. 28, 2014 which in turn claims priority to U.S. Patent Application 61/329,641 filed on Apr. 30, 2010, the contents of all of which are fully incorporated herein by reference.

FIELD OF THE INVENTION

The invention relates to structurally installed machinery for separating and/or purifying liquids, and more particularly to an electrically powered pump for draining water and other fluids from sites such as construction sites or flood situations.

BACKGROUND OF THE INVENTION

The present invention is a liquid filtering and transfer device for draining or pumping water, or any fluid, contaminated or not, from locations such as, but not limited to, basements, backyards, loading docks, parking lots, flooded roads, sports fields, construction sites, mines, animal farms, landfills, scrap yards or backyards flooded with water. These areas are traditionally difficult to clear because contaminants such as, but not limited to, dirt, solid particles, debris or silt may enter the pump and damage the pump or jams the pump impeller. The present invention solves this problem by placing the pump in a specially created filtering assembly that keeps the contaminants, particularly the solid particles, from engaging the pump.

The pump of the present invention may also serve as an effective erosion and sediment control product. In such an application, the filtered water may then be pumped out of the filtering assembly, away from the area to be drained and to a suitable disposal site such as, but not limited to, a storm water drainage system, a creek, a river, a green area or some combination thereof.

DESCRIPTION OF THE RELATED ART

The relevant prior art includes:

Various implements are known in the art, but fail to address all of the problems solved by the invention described herein. One embodiment of this invention is illustrated in the accompanying drawings and will be described in more detail herein below.

SUMMARY OF THE INVENTION

A novel liquid filtering and transfer device is disclosed.

In a preferred embodiment, the liquid filtering and transfer device may have a fluid transfer pump enclosed within a substantially rigid, space enclosing housing. The fluid transfer pump may have an inlet strainer that may have one or more strainer openings. The strainer openings provide a fluid connection between the pump and an inner cavity of the enclosing housing, and may be located in a vicinity of the base of the pump. The device may also have one or more housing openings that provide a fluid connection between the inner cavity of the housing and an outer surface of the enclosing housing. In a preferred embodiment, the maximum size of the housing openings must be smaller than the minimum size of the strainer openings.

A discharge manifold may provide a fluid connection between the pump to an outside surface of the housing. The discharge manifold is preferably located in a vicinity of a top end of the enclosing housing so as to allow a top discharge of the transferred fluid. The discharge manifold diameter may range in size from a fraction of an inch to multiple inches.

In a further preferred embodiment of the invention, the discharge manifold may protrude through the sidewall of the housing, allowing a side discharge of the transferred fluid.

In alternate embodiments the fluid transfer device of this invention may include additional features such as, but not limited to, one or more openings in the base of the housing, a shock absorber, a float device to turn off the pump when there is no fluid to be pumped, an access door to allow resetting of the float device and easy access to the inner cavity of the enclosing housing, a check valve to prevent backflow, one or more air-lock prevention openings in the discharge manifold between the pump and the check valve, or some combination thereof.

The space enclosing housing may also or instead have a tapered outer surface to ease insertion and extraction of the housing from work sides, and a patterned or modulated lower or bottom surface to reduce friction and facilitate taking the pump off muddy surfaces.

Other features of the present invention may, for instance, include elements such as, but not limited to, hooks for hoisting, wheels for transporting, lifting ropes with knots for deploying and retrieving, a flag holder to secure a locating flag, coco-fiber or other filter fabric that may be situated to partially or fully cover the inner or outer side walls of the enclosing housing, or some combination thereof.

Therefore, the present invention succeeds in conferring the following, and others not mentioned, desirable and useful benefits and objectives.

It is an object of the present invention to provide a liquid transfer device having a protective housing.

It is another object of the present invention to provide a liquid transfer device capable of filtering the liquid being transferred.

Yet another object of the present invention is to provide a device for pumping water or other liquids out of from locations such as, but not limited to, basements, loading docks, parking lots, flooded roads, sports fields, construction sites, mines, animal farms, landfills, scrap yards or backyards flooded with water.

Still another object of the present invention is to provide a device capable of operating in either deep or shallow waters.

Still another object of the present invention is to provide a device where openings may be uniform or may vary in diameter, with the largest diameter being closest to the top of the housing.

Yet another object of the present invention is to provide a liquid transfer where a water level detection device controls the actuation switch for the liquid transfer motor.

It is still another object of the present invention is to provide a device having a fine filtration element that may be removed for cleaning.

Another objective of the invention is to provide a waterproof pump that operates in corrosive environments.

Another objective of the invention is to provide a housing to protect the float from debris that may cause it to stick in an on or an off position.

Another objective of the invention is to protect the pump from running dry and burning out.

Another objective of the invention is to provide a 100% fully assembled site drainer requiring no tools, materials or additional parts to operate.

A further objective of the invention is to provide a site drainer which allows an operator to simply connect the hose, plug in the cable and drop the site drainer where it is needed.

DESCRIPTION OF THE PREFERRED EMBODIMENTS

Figure 1:
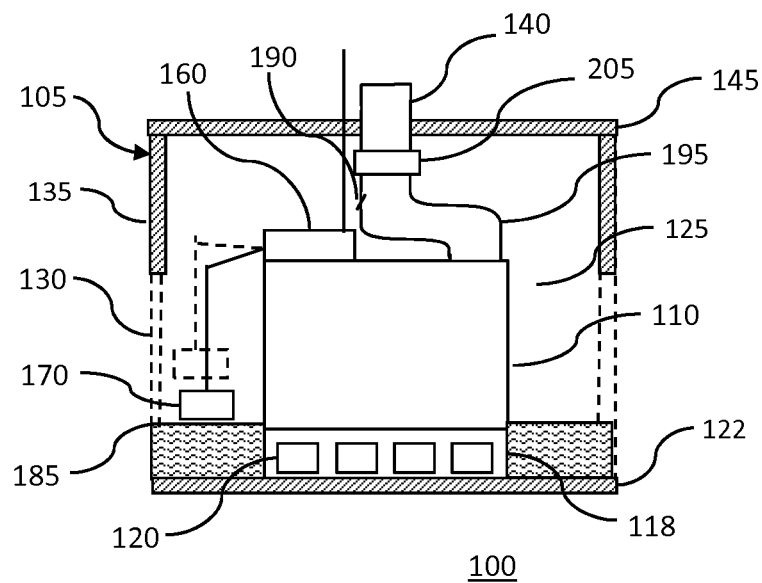
FIG. 1 shows a cross-sectional view of a preferred embodiment of the present invention.

The preferred embodiments of the present invention will now be described with reference to the drawings. Identical elements in the various figures are identified with the same reference numerals.

Various embodiments of the present invention are described in detail. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a cross-sectional side-view of a preferred embodiment of the present invention.

In a basic, preferred embodiment of the liquid filtering and transfer device 100, there may be a fluid transfer pump 110 that may be located within a rigid, space enclosing housing 105. The rigid, space enclosing housing 105 may have one or more housing openings 130 that connect an inner cavity 125 of the housing to an outer surface 135 of the housing.

The fluid transfer pump 110 may have an inlet strainer 118 that may have one or more strainer openings 120. The inlet strainer 118 may, for instance, be located in a vicinity of the base of the liquid filtering and transfer device 100 while a discharge manifold 140 that may be fluidly connected to the fluid transfer pump 110 may be located in a vicinity of the top end 145 of the housing.

In a preferred embodiment of the present invention, the liquid filtering and transfer device 100 may be located in a site requiring drainage such as, but not limited to, a construction site, a flooded basement or land requiring drainage. Power may be supplied to the fluid transfer pump 110 so that water from the site that drains through the housing openings 130 into the inner cavity 125 may then be pumped out and discharged via the discharge manifold 140 and any necessary additional hoses. Having an inlet strainer 118 as a part of the fluid transfer pump 110 may allow the pump to be unaffected by any significant debris that may penetrate in to the inner cavity 125.

In a preferred embodiment, the maximum size of the housing openings 130 may be kept smaller than the minimum size of the strainer openings 120 thereby ensuring that the inlet strainer 118 may not clog and that the fluid transfer pump 110 may not be impeded by debris.

In a further preferred embodiment of the invention, the housing openings 130 may vary in size with smaller openings in a vicinity of the base 155 (shown in FIG. 2) of the housing, and which may become progressively larger the further up the housing they are located.

In a preferred embodiment, the fluid transfer pump 110 may be an electric pump and may be powered by electricity supplied from an external source via electrical cables that may, for instance, be fed to the pump alongside the discharge manifold 140. In alternate embodiments, the pump may be powered by other means such as, but not limited to, compressed air or by electricity generated by alternative means such as, but not limited to, a gas powered generator, a vehicle, solar power or some combination thereof.

The rigid, space enclosing housing 105 is preferably made from an inexpensive, rugged, easy to fabricate material such as, but not limited to, a plastic or rubber, such as, but not limited to, polyethylene terephthalate (PET), polyethylene (PE), high-density polyethylene (HDPE), polyvinyl chloride (PVC), low-density polyethylene (LDPE) polypropylene (PP), polystyrene (PS), high impact polystyrene, polyamides (PA) (Nylons), acrylonitrile butadiene styrene (ABS), polycarbonate (PC), polycarbonate/acrylonitrile butadiene styrene blend (PC/ABS), polyurethanes (PU), or some combination and/or blend thereof.

The housing openings 130 are preferably be molded into the material of the housing, though in alternate embodiments they may combine machined and/or molded openings in the housing. The housing openings 130 may additionally be effectively reduced in individual size by using additional filter materials such as, but not limited to, nylon netting, metallic mesh, woven fiber or some combination thereof, that may be removably attached to the outside of the rigid, space enclosing housing 105.

Figure 2:
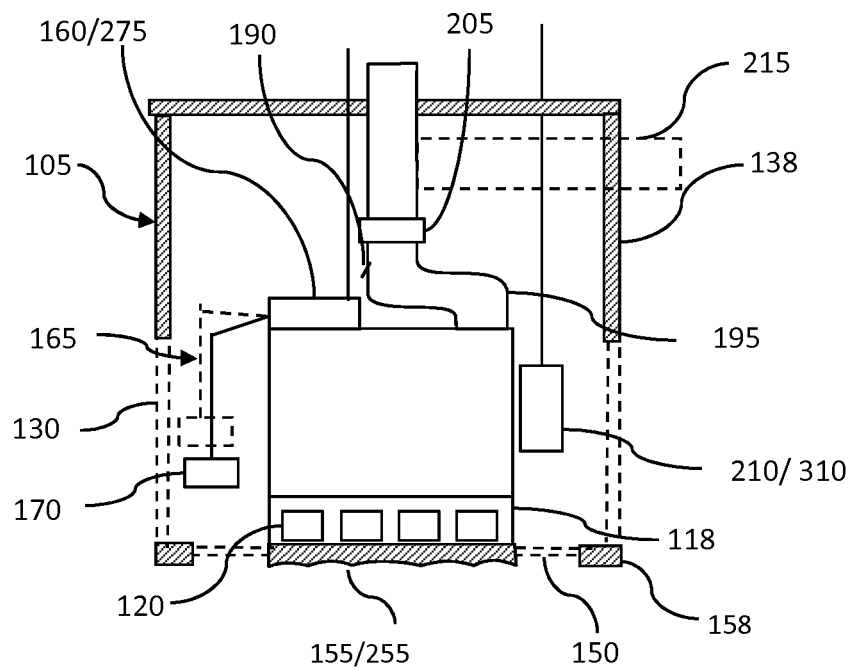
FIG. 2 shows a cross-sectional view of a further preferred embodiment of the present invention.

FIG. 2 shows a cross-sectional side-view of a further preferred embodiment of the present invention.

In the embodiment shown in FIG. 2, the liquid filtering and transfer device 100 may further include a restrained floatation device 165. In a preferred embodiment, the restrained floatation device 165 may consist of a restrained float 170 that is constrained to move only up or down in a vertical direction by a vertical restraint. In this way, the restrained float 170 may provide an indication of the fluid level 185, i.e., the level of the water that may be in the interior of the liquid filtering and transfer device 100. The restrained float 170 may be functionally connected such that when the fluid level in the pump housing falls below a predetermined level, the discharge pump may be turned off. In this way the pump may be prevented from operating dry, i.e., with no water to pump, a mode of operation that may be damaging to a pump.

The liquid filtering and transfer device 100 of the embodiment of FIG. 2 may also include a check valve 205 that may help prevent discharged water from flowing back down the discharge manifold. The check valve 205 may also enable the discharge pump to expel water to a greater height.

A further possible enhancement shown in FIG. 2 may be the alternate position of the outlet manifold 215 that may, for instance, be fed through the side wall of the enclosing housing to allow a lateral discharge of the fluid being pumped. This arrangement may, for instance, be advantageous in a situation where the water to be pumped is relatively shallow, and the discharge reservoir is located at a similar height, but horizontally removed.

FIG. 2 also shows an air-lock prevention hole 190. The air-lock prevention hole 190 may be a hole that may be angled downward from inside the discharge manifold at about 45 degrees. The air-lock prevention hole 190 may be located between the check valve 205 and the discharge pump, and preferably in a vicinity of the check valve 205.

The diameter of the air-lock prevention hole 190 may be related to the diameter of the discharge pipe. For instance, a ⅛ inch diameter air-lock prevention hole 190 has been found to work well with discharge manifolds having a 1½ inch diameter. Similarly, a ³⁄₁₆ inch air-lock prevention hole 190 has been found to work well with a 2 inch diameter discharge manifold.

The embodiment shown in FIG. 2 may also include two 90 degree elbows 195. This may be used as shown, to laterally off-set the discharge manifold from the axis of the pump. Such an arrangement may, for instance, assist the check valve 205 in preventing fluid returning to the pump by reducing the impact of the water on the check valve. A check valve is typically located at a reasonable distance above a pump to reduce the cracking pressure of the valve, i.e., the pressure supplied by the pump in excess of the pressure of the column of fluid above the pump. For typical diameters of piping used in draining construction sites, a distance of at least 24 inches above a pump is recommended. Such a distance may make a liquid filtering and transfer device 100 large and unwieldy. On method of avoiding a need for height in separating a check valve from a pump is to have angled bends between the pump and the check valve as these provide effective additional pressure and maintain a reasonable cracking pressure of the check valve. In a preferred embodiment, two 90 degree elbows 195 may provide a cracking pressure relief equivalent to a 24 inch rise, but with a reduced vertical size of the liquid filtering and transfer device 100.

FIG. 2 also shows a base opening 150. This may, for instance, be used to pump shallow sites and may also function as a floor sucker.

A heating unit 210 may be integrated into the liquid filtering and transfer device 100 and installed in a vicinity of the discharge pump. This heating unit 210 may be a thermoelectric heating element and may serve to prevent the pump from freezing up in very cold environments. Such and integrated heating unit 210 may have power cables that connect via the pump power cables and a thermostat that may be microprocessor controlled to regulate the heating.

Alternately, the heating unit 210 may be a removable unit that may be supplied separately from the rest of the equipment. In such a version, the heating unit power cables may be separate from the pump power cables, as shown schematically in FIG. 2.

Figure 3:
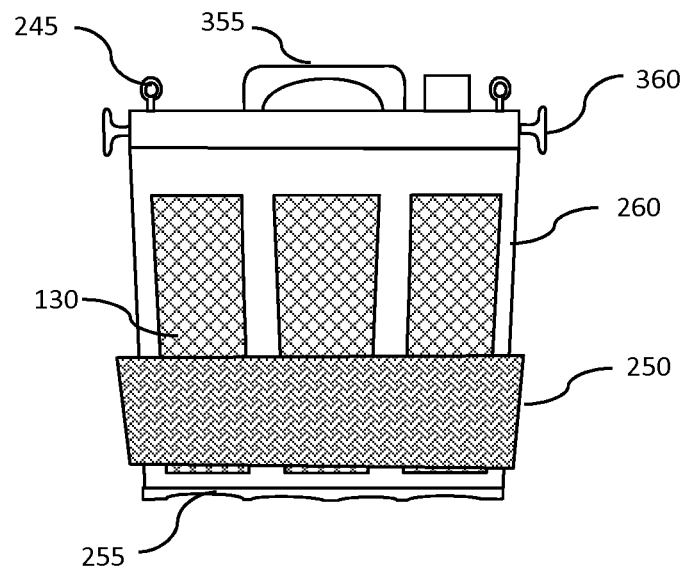
FIG. 3 shows an exterior side-view of a preferred embodiment of the present invention.

FIG. 3 shows an exterior side-view of a preferred embodiment of the present invention.

In this embodiment the liquid filtering and transfer device 100 may have a tapering housing wall 260. The tapering housing wall 260 may extend along the entire depth of the device, or may only occur along a lower portion of the device. The tapering housing wall 260 may, for instance, be useful in either lowering the device into a site, or in removing it from a site.

Other features shown in FIG. 3 that may be part of the liquid filtering and transfer device 100 include a removable filter 250 and a lifting handle 355 as well as lifting hooks 240.

The removable filter 250 may be located externally or internally to the housing. The external removable filter 250 may, for instance, be used to prevent fine debris from entering the pump containing housing, and may be removed when it becomes clogged with debris. The external removable filter 250 may fully or partially cover the wall of the housing and may be made of a filter fabric material such as, but not limited to, coco fiber.

The top lifting hook 245 may serve as a lifting handle or as an attachment point for a lifting cable of rope. In a preferred embodiment, the lifting rope may be knotted to provide a grip for lifting.

The lifting hooks 240 may, for instance, be side-hooks 360 suitable for cable wrapping. The lifting hook 240 may also extend to the base of the liquid filtering and transfer device 100, where it may be held in place with a bolt. Such an arrangement may allow the entire weight of the device to be supported by the hooks.

The liquid filtering and transfer device 100 may have a modulated suction reducing base 255. The modulated suction reducing base 255 may be shaped to reduce suction between the floor of the site and the pump and so help reduce the effort to remove the pump from a site such as, but not limited to, a site having a muddy floor.

Figure 4:
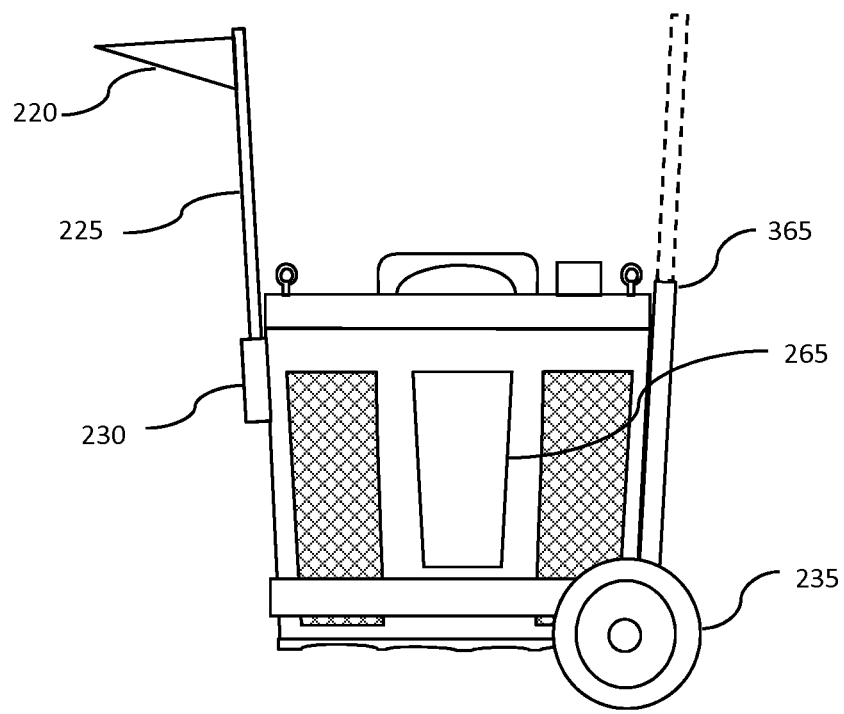
FIG. 4 shows an exterior side-view of a further preferred embodiment of the present invention.

FIG. 4 shows an exterior side-view of a further preferred embodiment of the present invention. In such an embodiment, the liquid filtering and transfer device 100 may further include a locating flag 220, an access door 265, two or more transporting wheels 235 and an extendable cart handle 365.

The locating flag 220 may, for instance, include a flag pole 225 and a flag pole holder 230. The flag pole holder 230 may, for instance, be permanently attached to the exterior of the device, while the flag pole 225 and locating flag 220 may be removable. The flag pole 225 may be capable of telescoping so that the flag height is adjustable to suit site conditions.

The access door 265 may allow access to the inside of the device for purposes such as, but not limited to, cleaning the interior, resetting the float, inspecting the pump or repairing the pump, or some combination thereof. In a further preferred embodiment of the invention, the access door 265 may be circular so that, like a manhole cover, it cannot accidently fall into the housing.

The transporting wheels 235 may allow the pump to be moved from one location or place to another location or place on a site, or another site. The transporting wheels 235 may, for instance, be useful for moving relatively large liquid filtering and transfer devices 100.

The extendable cart handle 365 may function in a manner similar to the well-known handles on wheeled luggage devices, i.e., it may be stowed in a retracted mode, and then extended into an operational mode that may allow a user easy access and suitable leverage.

Figure 5:
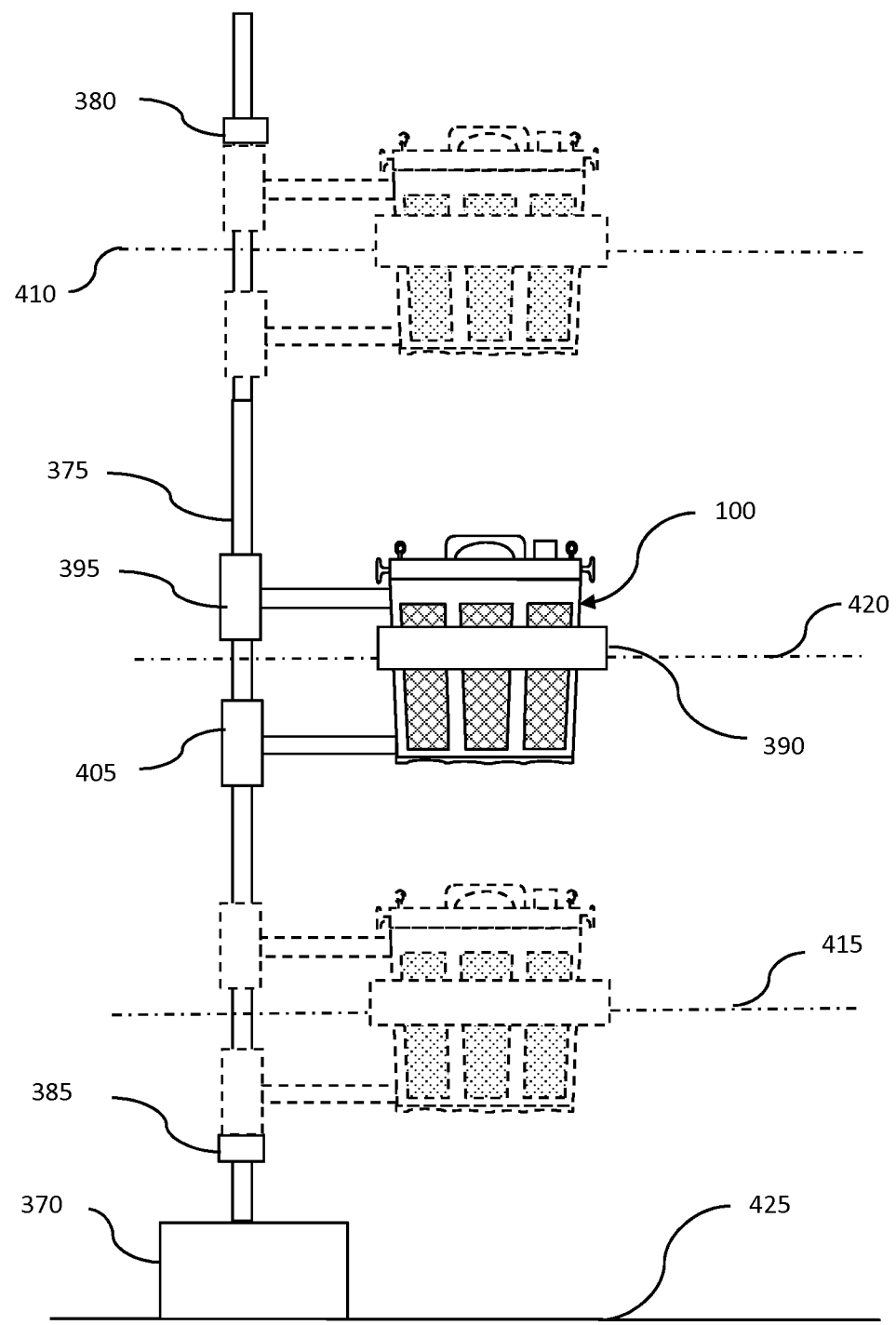
FIG. 5 shows an anchored pump arrangement of a further preferred embodiment of the present invention.

FIG. 5 shows an anchored pump arrangement of a further preferred embodiment of the present invention.

In such an embodiment, the liquid filtering and transfer device 100 may be attached to an anchor pole 375. Such an anchor pole 375 may, for instance, be held on the floor 425 of the site being pumped by an anchor block 370. The liquid filtering and transfer device 100 may in turn be attached to the anchor pole 375 by an upper sliding support 395 and a lower sliding support 405. These supports may allow the liquid filtering and transfer device 100 to move freely up and down the anchor pole 375. The liquid filtering and transfer device 100 may further have a floatation device 390 attached to it. The floatation device 390 may be as simple as an inflated inner tube, or may be a more sophisticated construction of a suitably buoyant material to support the liquid filtering and transfer device 100 on a fluid such as, but not limited to, water.

The floatation device 390 may be a structure such as, but not limited to, a circular cushion, an air band, an air filled tube, a band of multiple air pockets or some combination thereof. The floatation device may also be a semicircular float so as to bring the center of buoyancy closer to the anchor pole and thereby facilitate sliding the liquid filtering and transfer device 100 up and down the anchor pole.

The anchor pole 375 may have a upper anchor stop 380 and a lower anchor stop 385. These stops may be any suitable device attached or clamped to the anchor pole 375 that may prevent the upper sliding support 395 or the lower sliding support 405 moving past them.

When the water level rises, the liquid filtering and transfer device 100 may move up the anchor pole 375 until the upper sliding support 395 encounters the upper anchor stop 380. At this point the liquid filtering and transfer device 100 is held steady and as long as it has sufficient pumping power, maintains the water level of the site at the upper water level limit 410.

When the water level falls, the liquid filtering and transfer device 100 may move down until the lower sliding support 405 engages the lower anchor stop 385. The liquid filtering and transfer device 100 may then be held in place and the water level of the site may be held at the lower water level limit 415.

At any time during operation, the water level may be held at current water level 420 with respect to the floor 425 of the site.

When power to the liquid filtering and transfer device 100 is being supplied from a fixed supply such as, but not limited to, the electric power grid or a solar panel array, when the liquid filtering and transfer device 100 reaches the upper anchor stop 380, the pump may be turned on. Similarly, when the device 100 reaches the lower anchor stop 385, the pump may be turned off.

When, however, power to the device 100 is being supplied from a local, controllable supply such as, but not limited to, an electric generator or a vehicle, when the device 100 reaches the upper anchor stop 380, the generator or vehicle may first be activated and then the pump turned on. When in this scenario, the device 100 reaches the lower anchor stop 385, the pump may first be turned off, and then the local generator or vehicle may be turned off. This may, for instance, be done using switches associated either with the upper and lower anchor stops 380 and 385, or with switches associated with the upper and lower sliding support 395 and 405, or some combination thereof.

The liquid filtering and transfer device 100 may also incorporate a shock absorber to help protect sensitive parts of the pump against rough handling such as, but not limited to, being dropped on its side. The shock absorber may, for instance, be a structure such as, but not limited to, an air-filled band, or a cushioning band that may be placed at the top end of the liquid filtering and transfer device 100 and may be permanently attached or may be removable.

Figure 6:
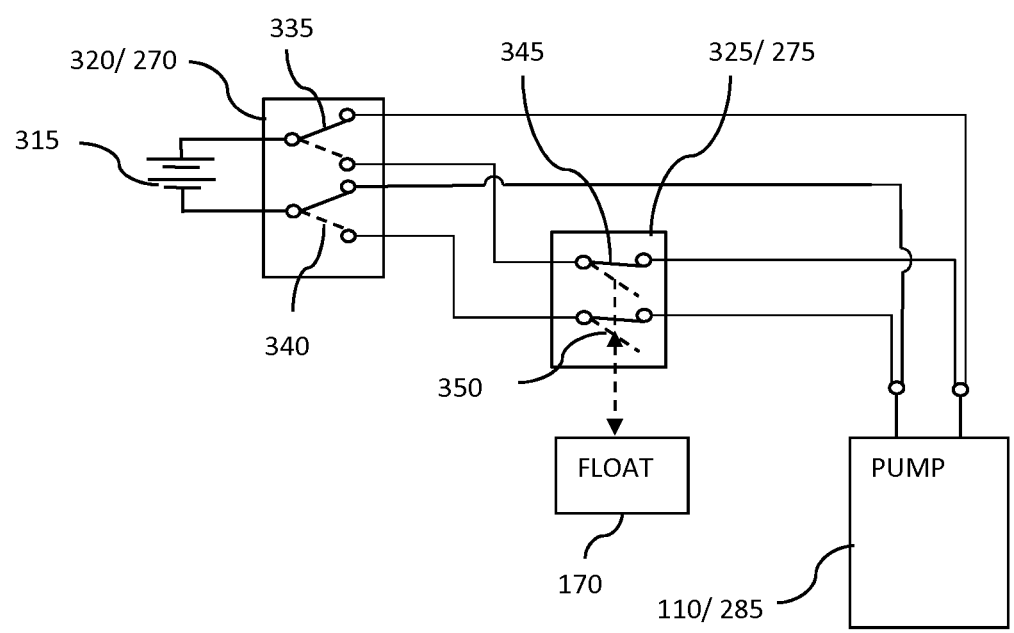
FIG. 6 shows a schematic wiring diagram of a preferred embodiment of the present invention.

FIG. 6 shows a schematic wiring diagram of a preferred embodiment of the present invention.

The wiring may control power supplied from an external electrical power supply 315 to operate the electric pump 285.

The electrical power supply 315 may typically be an AC power supply and, depending on the pump specification may operate at a variety of voltages and number of phases. A small pump may, for instance, operate off a single phase, 110 V power supply, while a larger pump may require a 220 V, two or three phase power supply.

The first control may be a manually operated pump switch 270 that may, for instance, be a double pole, double throw switch. This manually operated pump switch 270 may then be functionally connected such that in a first state 335, power from the source of electrical power 315 may be directed to the fluid transfer pump 110 causing it to operate. The manually operated pump switch 270 may also be functionally connected such that in a second state 340 it may be connected in series with a second electrical power switch 325 that may, for instance, be a double pole, single throw switch. The second electrical power switch 325 may be activated by a restrained float 170 that may be indicative of the water level with respect to the base of the pump. When the sensor operated pump switch 275 is in a first state 345, the electric pump 285 may be made operational by power from the source of electrical power 315, while when in a second state 350 the pump may be idle. In this manner, the fluid transfer pump 110 may be protected from operating dry, i.e., from attempting to pump when there is no water to pump. This may be necessary as many pumps can be damaged if operated in such conditions for any appreciable length of time.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A relocatable liquid filtering and transfer device, comprising:
   a substantially rigid, space enclosing housing having attachments that facilitate the relocation and redeployment of the filtering and transfer device;
   a fluid transfer pump having an inlet strainer, said fluid transfer pump being located within said housing in a vicinity of a lower end of said housing, said inlet strainer having a plurality of strainer openings fluidly connecting an inner cavity of said housing to said fluid transfer pump;
   a plurality of housing openings fluidly connecting said inner cavity of said housing to an outer surface of said housing; and
   wherein the maximum size of said housing openings is smaller than the minimum size of said strainer openings.

2. The device of claim 1 further comprising a discharge manifold fluidly connected to said fluid transfer pump, and wherein said discharge manifold is located in a vicinity of a top end of said housing, thereby allowing a top discharge of the transferred fluid.

3. The device of claim 2 wherein said discharge manifold further comprises a check valve fluidly connecting said pump to said discharge manifold.

4. The device of claim 3 wherein said discharge manifold further comprises an air-lock prevention hole, located between said check valve and said pump, and angled downward from within said discharge manifold to outside said discharge manifold.

5. The device of claim 4 wherein said air-lock prevention hole is angled downward at substantially 45 degrees.

6. The device of claim 3 wherein said discharge manifold further comprises two 90 degree elbows.

7. The device of claim 1 further comprising a discharge manifold fluidly connected to said fluid transfer pump, and wherein said discharge manifold protrudes through a sidewall of said housing, thereby allowing a side discharge of the transferred fluid.

8. The device of claim 1 wherein said plurality of housing openings comprises at least one base opening fluidly connecting an outer surface of a base of said housing to said inner cavity of said housing.

9. The device of claim 1 wherein said fluid transfer pump is an electrically driven fluid transfer pump, and further comprising:
   a source of electrical power;
   a first power switch and a second electrical power switch;
   a restrained float functionally restrained to move vertically up and down in response to a fluid level within said inner cavity of said housing; and
   wherein said source of electrical power, said first and second electrical power switches and said fluid transfer pump are functionally connected such that when said first electrical power switch is in a first state, said source electrical power causes said electrical transfer pump to operate; and
   when said first electrical power switch is in a second state, said source of electrical power causes said electrical transfer pump to operate only if said second electrical power switch is in a first state and not in second state, said first state being indicative of said float being above a cut-off threshold level of fluid within said inner cavity of said housing thereby preventing said fluid transfer pump from operating while dry and potentially being damaged.

10. The device of claim 9 wherein said housing further comprises an access door, located and sized so as to allow access to said inner cavity of said housing.

11. The device of claim 1 wherein a bottom of said housing has a patterned lower surface, thereby reducing suction between said bottom and a material on which said bottom is resting.

12. The device of claim 1 further comprising a removable or integrated heating unit located within said housing.

13. The device of claim 1 further comprising a pair of wheels attached in a vicinity of the bottom of the liquid filtering and transfer device, and having a telescoping handle functionally attached to said pair of wheels, thereby facilitating movement of the pump from location to location.

14. The device of claim 1 wherein the attachments facilitating the relocation and redeployment of the filtering and transfer device comprise: lifting hooks, pole holders, sliding supports and floatation devices.

15. The device of claim 1 wherein at least one removable filter is attached to said device housing externally or internally.

16. A relocatable liquid filtering and transfer device, comprising:
   a substantially rigid, space enclosing housing having external attachments that facilitate the relocation and redeployment of the filtering and transfer device, wherein the attachments comprise: lifting hooks, pole holders, sliding supports and floatation devices;
   a fluid transfer pump having an inlet strainer, said fluid transfer pump being located within said housing in a vicinity of a lower end of said housing, said inlet strainer having a plurality of strainer openings fluidly connecting an inner cavity of said housing to said fluid transfer pump;
   a plurality of housing openings fluidly connecting said inner cavity of said housing to an outer surface of said housing, wherein the maximum size of said housing openings is smaller than the minimum size of said strainer openings, and wherein at least one removable filter is attached to said housing externally or internally.

* * * * *